(12) United States Patent
McGuire

(10) Patent No.: US 8,528,585 B2
(45) Date of Patent: Sep. 10, 2013

(54) QUICK-CHANGE WEAR SLEEVE FOR A HIGH-PRESSURE FLUID CONDUIT

(75) Inventor: Bob McGuire, Oklahoma City, OK (US)

(73) Assignee: Oil States Energy Services, L.L.C., Houston, TX (US)

( * ) Notice: Subject to any disclaimer, the term of this patent is extended or adjusted under 35 U.S.C. 154(b) by 1352 days.

(21) Appl. No.: 11/414,582

(22) Filed: Apr. 28, 2006

(65) Prior Publication Data
US 2007/0251578 A1    Nov. 1, 2007

(51) Int. Cl.
*F16L 7/00*    (2006.01)

(52) U.S. Cl.
USPC .......... 137/375; 137/315.01; 285/16; 285/18; 285/55; 285/321

(58) Field of Classification Search
USPC .............. 137/375, 454.2, 315.01, 315.41, 137/329; 166/75.13, 75.14, 85.1, 379, 382, 166/90.1, 177.5; 285/55, 305, 321, 16, 18, 285/39
See application file for complete search history.

(56) References Cited

U.S. PATENT DOCUMENTS

| | | | | |
|---|---|---|---|---|
| 2,792,845 A | * | 5/1957 | Atherton et al. | 137/375 |
| 3,247,914 A | * | 4/1966 | Slack | 175/7 |
| 3,750,749 A | * | 8/1973 | Giroux | 166/95.1 |
| 3,863,668 A | * | 2/1975 | Waters et al. | 137/375 |
| 3,937,247 A | * | 2/1976 | Van der Wal | 137/375 |
| 4,284,475 A | | 8/1981 | Anthony | |
| 4,285,406 A | * | 8/1981 | Garrett et al. | 175/195 |
| 4,471,978 A | * | 9/1984 | Kramer | 285/321 |
| 4,603,886 A | * | 8/1986 | Pallini et al. | 285/24 |
| 4,638,833 A | * | 1/1987 | Wolcott, II | 137/312 |
| 4,693,500 A | * | 9/1987 | Anderson | 285/94 |
| 4,732,364 A | * | 3/1988 | Seger et al. | 251/368 |
| 4,735,229 A | * | 4/1988 | Lancaster | 137/375 |
| 4,789,351 A | * | 12/1988 | Fisher et al. | 439/248 |
| 4,832,128 A | | 5/1989 | Light et al. | |
| 5,201,491 A | * | 4/1993 | Domangue | 251/122 |
| 5,472,244 A | * | 12/1995 | Nishikata et al. | 285/321 |
| 5,681,060 A | * | 10/1997 | Berg et al. | 285/305 |
| 5,845,945 A | * | 12/1998 | Carstensen | 285/321 |
| 6,367,546 B1 | * | 4/2002 | Mentesh et al. | 166/91.1 |
| 6,892,818 B2 | * | 5/2005 | Mentesh et al. | 166/373 |
| 6,899,172 B2 | | 5/2005 | McLeod et al. | |
| 7,213,641 B2 | | 5/2007 | McGuire et al. | |
| 2003/0155130 A1 | * | 8/2003 | Mentesh et al. | 166/374 |
| 2004/0251018 A1 | * | 12/2004 | McLeod et al. | 166/75.13 |
| 2006/0011236 A1 | * | 1/2006 | Suter et al. | 137/375 |
| 2006/0027779 A1 | | 2/2006 | McGuire et al. | |
| 2006/0091347 A1 | | 5/2006 | McGuire et al. | |

* cited by examiner

*Primary Examiner* — John Fox
*Assistant Examiner* — Kevin Murphy
(74) *Attorney, Agent, or Firm* — Nelson Mullins Riley & Scarborough, LLP

(57) ABSTRACT

A quick-change wear sleeve for a high pressure fluid conduit is retained in a fluid passage of the fluid conduit by a resilient retainer ring received in complementary grooves in an outer surface of the quick-change wear sleeve and an inner surface of the fluid passage.

18 Claims, 10 Drawing Sheets

QUICK-CHANGE WEAR SLEEVE FOR A HIGH-PRESSURE FLUID CONDUIT

CROSS-REFERENCE TO RELATED APPLICATIONS

This is the first application filed for the present invention.

MICROFICHE APPENDIX

Not Applicable.

TECHNICAL FIELD

The present invention relates generally to high-pressure fluid conduits for abrasive fluids and, in particular, to a quick-change wear sleeve for prolonging a service life of such fluid conduits.

BACKGROUND OF THE INVENTION

Most oil and gas wells require some form of stimulation treatment either during completion or re-completion in order to stimulate production from the well. Many well stimulation treatments require that well stimulation fluids be pumped at high pressure and at high rates into the well. Those well stimulation fluids are frequently laden with abrasive proppants such as sharp sand, bauxite or ceramic particles. The conduits through which those fluids are pumped are therefore subject to wear due to erosion induced by the abrasive particles. That wear is commonly referred to in the field as "wash", and a fluid conduit that has eroded in this way is said to be "washed".

The problem of wash is particularly severe in fluid conduits where turbulent flow occurs. Turbulent flow is most common where two or more high-pressure streams converge. Consequently, flow convergence equipment such as "frac heads", "flow tees" and valves are generally most subject to wash. Frac heads resistant to wash have therefore been invented. For example, U.S. Pat. No. 6,899,172, which issued May 31, 2005 to McLeod et al. describes an abrasion resistant frac head. Assignee's co-pending patent application Ser. No. 10/979,328 which was filed on Nov. 2, 2004 and entitled Fracturing Head With Replaceable Inserts For Improved Wear Resistance and Method Of Refurbishing Same, describes a fully sleeved frac head that is very abrasive resistant. Assignees co-pending United States patent application having a publication number 20060027779 which was published on Feb. 9, 2006 and entitled Hi-Pressure Plug Valve with Replaceable Inserts and Method of Refurbishing Same, describes an abrasion resistant plug valve.

While each of these inventions has merit, refurbishing them requires time and skill.

It is therefore highly desirable to provide a quick-change wear sleeve for high-pressure fluid conduits.

SUMMARY OF THE INVENTION

It is an object of the present invention to provide a quick-change wear sleeve for high-pressure fluid conduits.

The invention therefore provides a quick-change wear sleeve for a high-pressure fluid conduit having an inner wall for receiving the quick-change wear sleeve, the quick-change wear sleeve comprising: an elongated hollow cylindrical hardened sleeve having an inner wall and an outer wall, the outer wall including a rectangular groove; and a retainer ring received in the rectangular groove, the retainer ring releasably engaging a complementary groove in the inner wall of the fluid conduit when the quick-change wear sleeve is inserted into the fluid conduit.

The invention further provides an abrasion resistant frac head, comprising: a top end and a bottom end respectively adapted for connection to other components of a well stimulation setup; at least one side port communicating with an axial passage that provides fluid communication between the top end and the bottom end; the axial passage having a first diameter adjacent the top end, and a second larger diameter below the at least one side port; and a quick-change wear sleeve removably retained in the second larger diameter of the axial passage.

The invention further provides a method of refurbishing an abrasion resistant fluid conduit, comprising: removing a worn quick-change wear sleeve from the fluid conduit; selecting a replacement quick-change wear sleeve for refurbishing the abrasion resistant fluid conduit; compressing a retainer ring of the quick-change wear sleeve using a ring compression tool; inserting the quick-change wear sleeve into the fluid conduit until the ring compression tool abuts an end of the fluid conduit; removing the ring compression tool from the quick-change wear sleeve; and inserting the quick-change wear sleeve into the fluid conduit until the retainer ring engages a complementary groove in the fluid conduit.

The quick-change wear sleeve in accordance with the invention can be used to line, or partially line substantially any fluid conduct through which high-pressure abrasive fluids are pumped.

BRIEF DESCRIPTION OF THE DRAWINGS

Further features and advantages of the present invention will become apparent from the following detailed description, taken in combination with the appended drawings, in which.

It should be noted that throughout the appended drawings, like features are identified by like reference numerals.

DETAILED DESCRIPTION OF PREFERRED EMBODIMENTS

The invention provides a quick-change wear sleeve used to line, or partially line, fluid conduits through which high-pressure abrasive fluids are pumped. The quick-change wear sleeve is secured in the fluid conduit by a retainer ring. The retainer ring is received in a peripheral groove in an outer wall of the quick-change wear sleeve and in a complementary groove in an inner wall of the fluid conduit. The quick-change wear sleeve is readily removed from the fluid conduit using a sleeve puller, or the like. A replacement quick-change wear sleeve is readily installed in the fluid conduit using a ring compressor, or the like. A fluid conduit equipped with a quick-change wear sleeve in accordance with the invention can therefore be quickly and easily refurbished.

Figure 1:
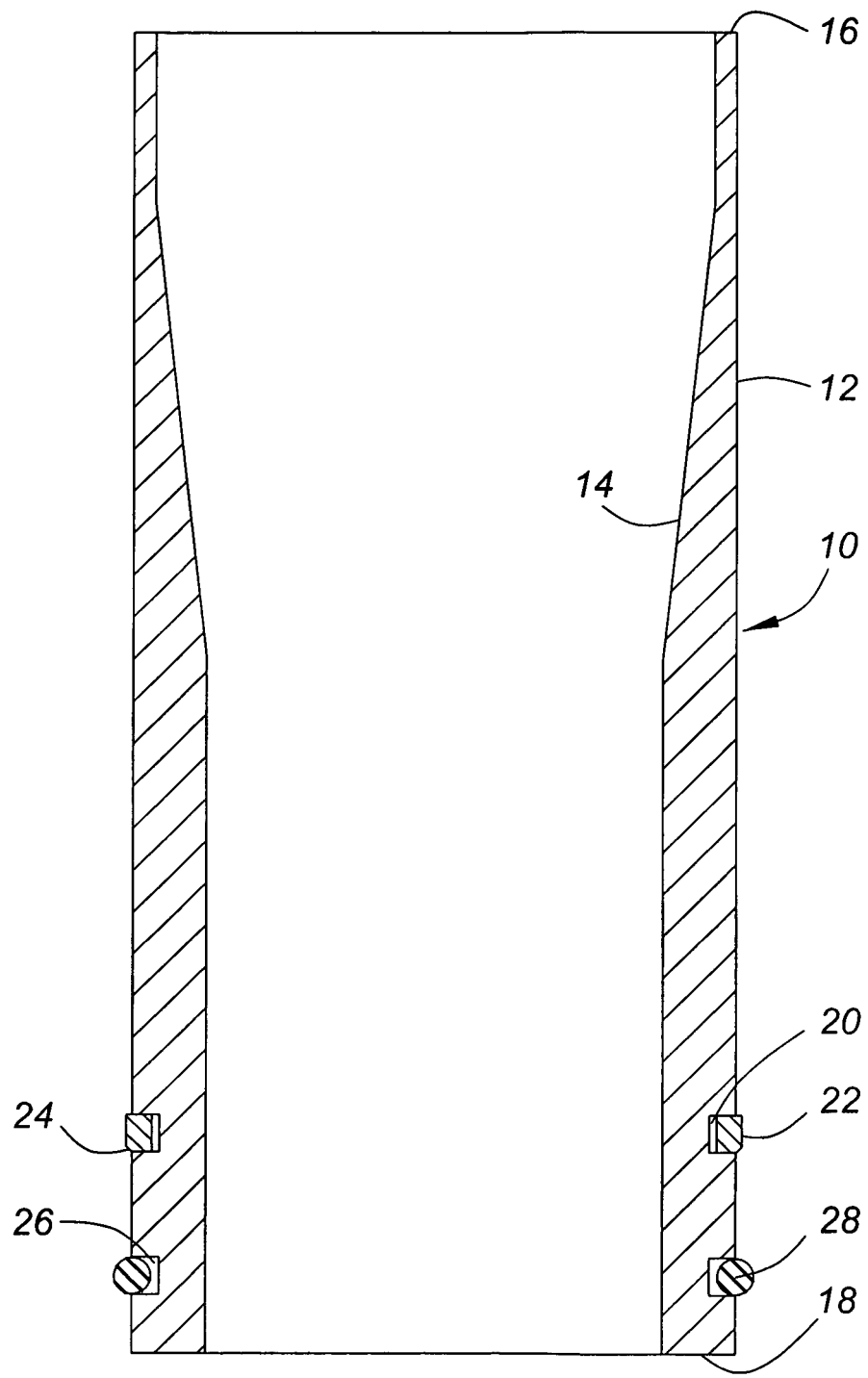
FIG. 1 is a cross-sectional view of a quick-change wear sleeve in accordance with one embodiment of the invention.

FIG. 1 is a schematic cross sectional diagram of an embodiment of a quick-change wear sleeve 10 in accordance with the invention. As shown in FIG. 1, the quick-change wear sleeve 10 is an elongated hollow cylinder of hardened steel that has an outer wall 12 and an inner wall 14. The inner wall 14 may be case-hardened using techniques well known in the art to increase abrasion resistance. The quick-change wear sleeve 10 further has a top end 16 and a bottom in 18. The outer wall 12 includes a rectangular annular groove 20 that receives a retainer ring 22. The retainer ring 22 is a compression ring. In one embodiment, the retainer ring 22 is made of 4140 steel. The retainer ring 22 includes an upwardly-angled outer bottom corner 24, as will be explained below in more detail with reference to FIG. 7. Located between the annular groove 20 and the bottom end 18 is an O-ring groove 26 that receives an O-ring 28 for providing a fluid seal between the quick-change wear sleeve 10 and an inner wall of a fluid conduit, as will be explained below in more detail with reference to FIGS. 3, 5, and 7. In this embodiment, the inner wall 14 is contoured to reduce flow turbulence, as will be explained below in more detail with reference to FIG. 3.

Figure 2:
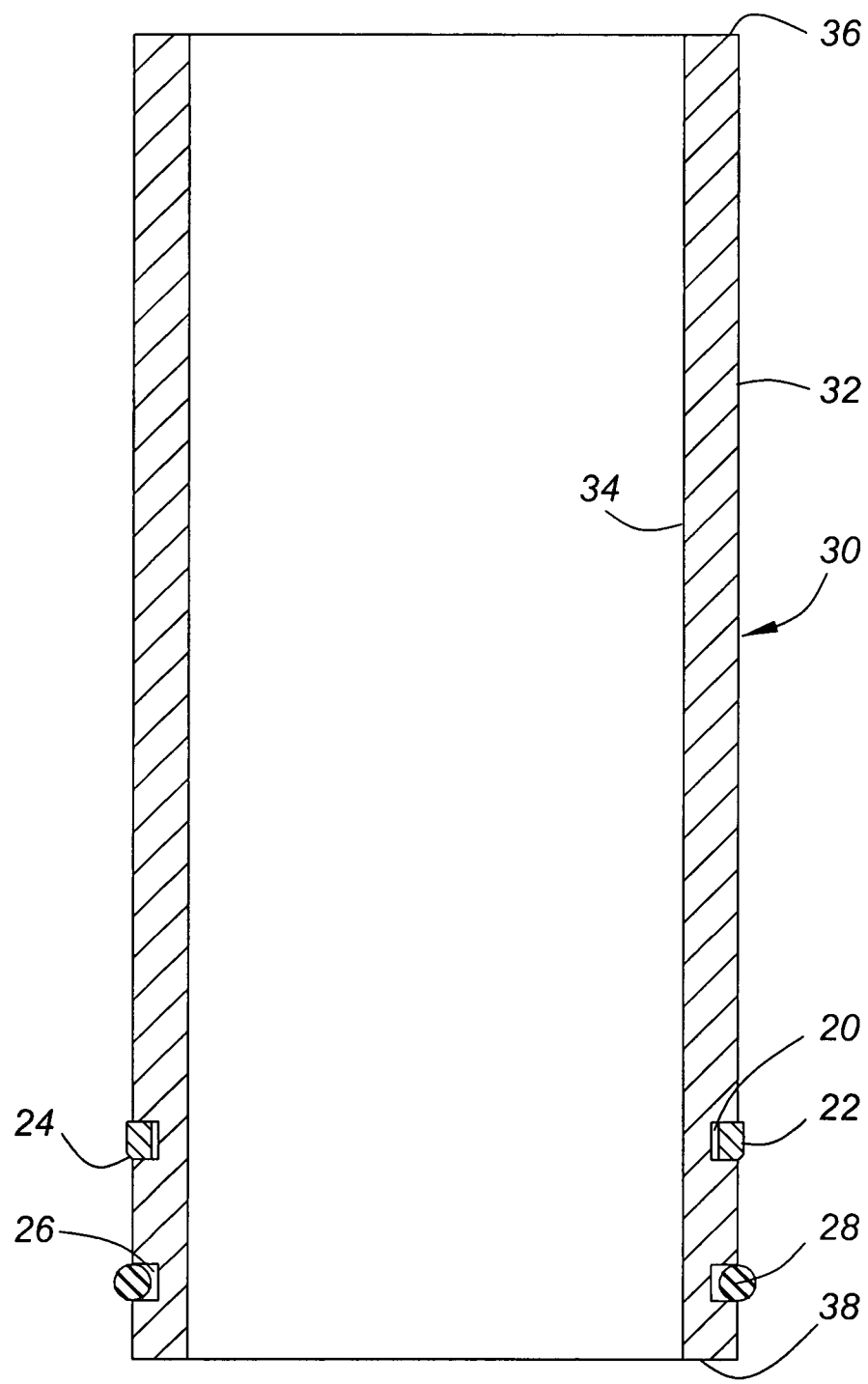
FIG. 2 is a cross-sectional view of a quick-change wear sleeve in accordance with another embodiment of the invention.

FIG. 2 is a schematic cross-sectional diagram of another embodiment of a quick-change wear sleeve 30 in accordance with the invention. The quick-change wear sleeve 30 is likewise a hollow cylindrical body of hardened steel having an outer wall 32 and an inner wall 34. As explained above with reference to FIG. 1, the outer wall 32 includes the annular groove 20 that receives the retainer ring 22. The quick-change wear sleeve 30 has a top end 36 and a bottom end 38. Located between the rectangular annular groove 20 and the bottom end 38 is an O-ring groove 26 that receives the O-ring 28 described above with reference to FIG. 1.

Figure 3:
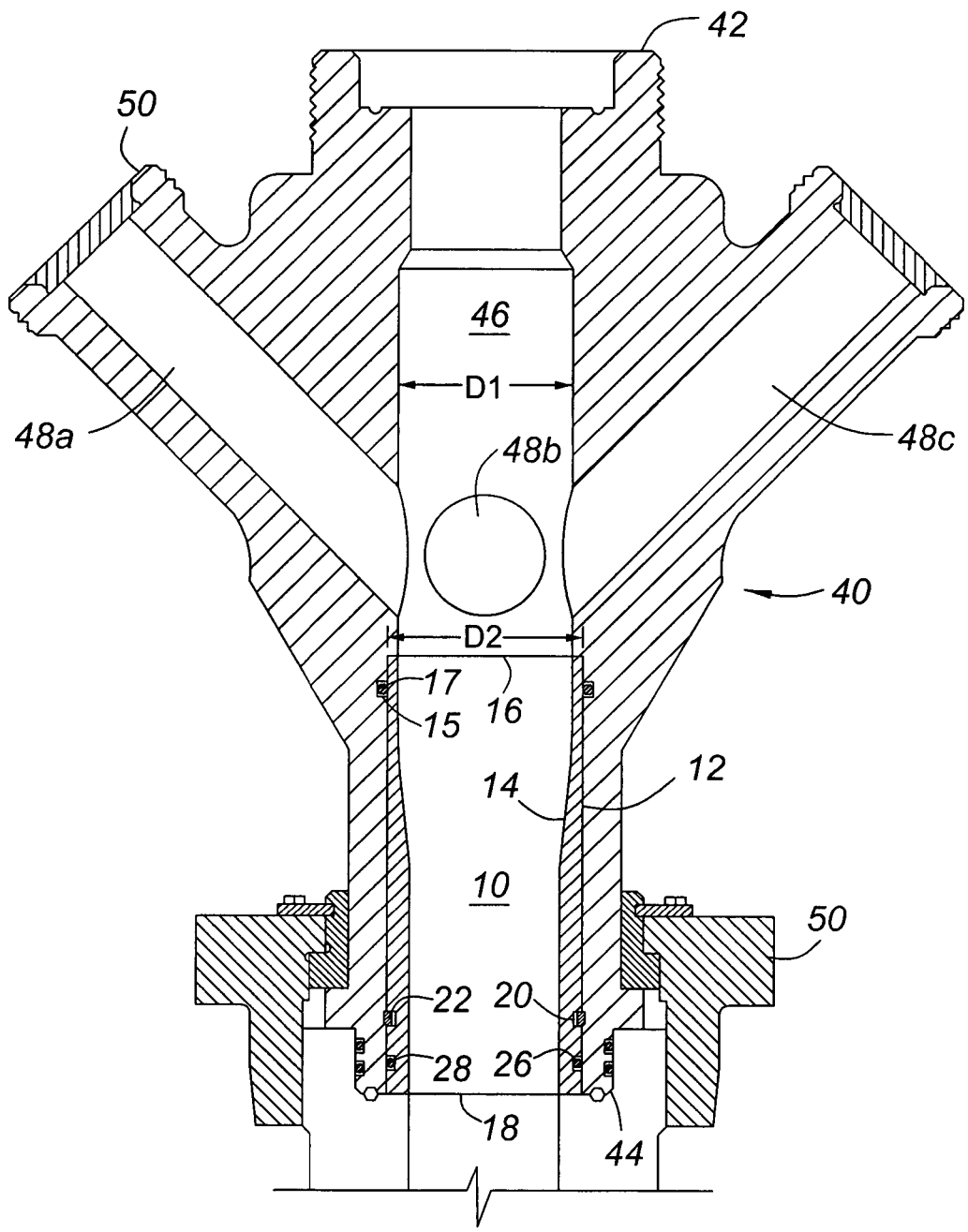
FIGS. 3 and 4 are cross-sectional views of four-port frac heads provisioned with the quick-change wear sleeve shown in FIG. 1.

FIG. 3 is a schematic cross-sectional diagram of a frac head 40 equipped with the quick-change wear sleeve 10 shown in FIG. 1. The frac head 40 is a four-port frac head engineered for a pressure rating of 20,000 psi. As will be understood by those skilled in the art, the wear sleeve 10 may be used in a frac head having two or more ports, and the number of ports in the frac head is a matter of design choice. The frac head 40 has a top end 42 and a bottom end 44. In this embodiment, the top end 42 and the bottom end 44 are designed for connection to other components of a well stimulation setup using a threaded union, as described in Assignee's co-pending United States patent publication No. US-2007-0013188-A1 published Jan. 18, 2007, the specification of which is incorporated herein by reference. A hammer nut 50 is used to connect the bottom end 14 of the frac head 40 to another component of a well stimulation setup, as explained in Assignee's co-pending patent application.

An axial passage 46 provides fluid communication between the top end 42 and the bottom end 44. The ports, only three of which are shown in this drawing, 48a, 48b and 48c, converge in the axial passage 46. Each port 48 terminates in a pin-threaded outer end 50 adapted for the connection of a frac line, well known in the art. The axial passage 46 has a first diameter D1 above a convergence point of ports 48 and a second diameter D2 below the convergence point of the ports 48. The second diameter D2 defines a cavity for receiving the quick-change wear sleeve 10. Near a top of the cavity defined by the second diameter D2 is an O-ring groove 15 that receives an O-ring 17. The O-rings 17 and 28 inhibit the intrusion of well stimulation fluids between the quick-change wear sleeve 10 and the frac head 40. This inhibits corrosion of the retainer ring 22 and facilitates removal of the quick-change wear sleeve 10 from the frac head 40.

As explained above, the inner wall 14 of the quick-change wear sleeve 10 is contoured to reduce flow turbulence in the converging flows pumped through the ports 48. This contour has proved to have beneficial effect with respect to reducing wash in the quick-change wear sleeve 10.

Figure 4:
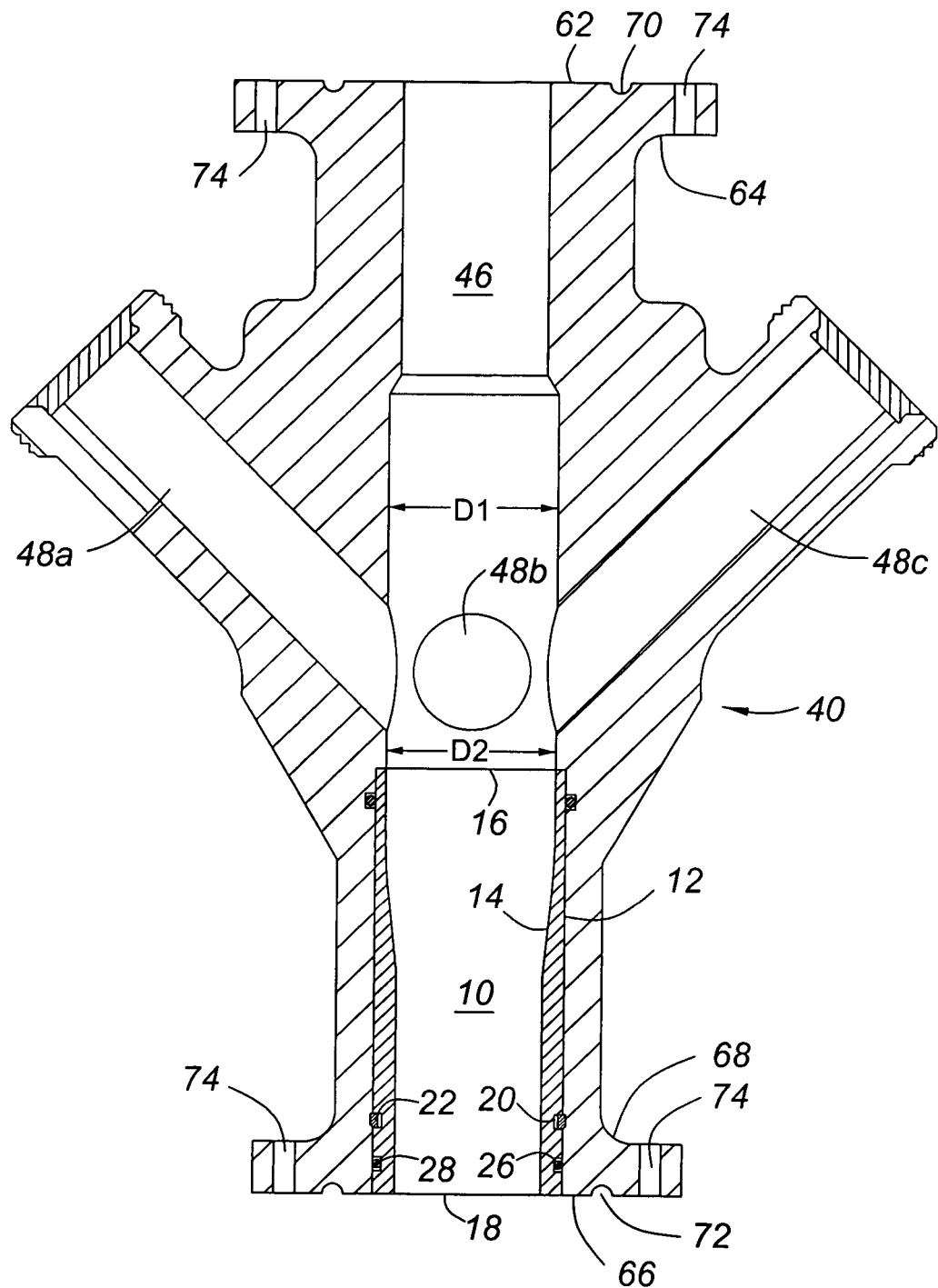

FIG. 4 is a cross-sectional diagram of another embodiment of a frac head 60 in accordance the invention. The frac head 60 is identical to the frac head 40 described above with reference to FIG. 3, with the exception that a top end 62 and a bottom end 66 of the frac head 60 terminate in respective flanges 64 and 68. The flanges 64 and 68 include a plurality of bores 74 for receiving flange bolts (not shown) in a manner well known in the art. Each flange 64, 68 includes a seal ring groove 70, 72 that receives a metal seal ring, typically a BX metal ring gasket which is well known in the art.

Figure 5:
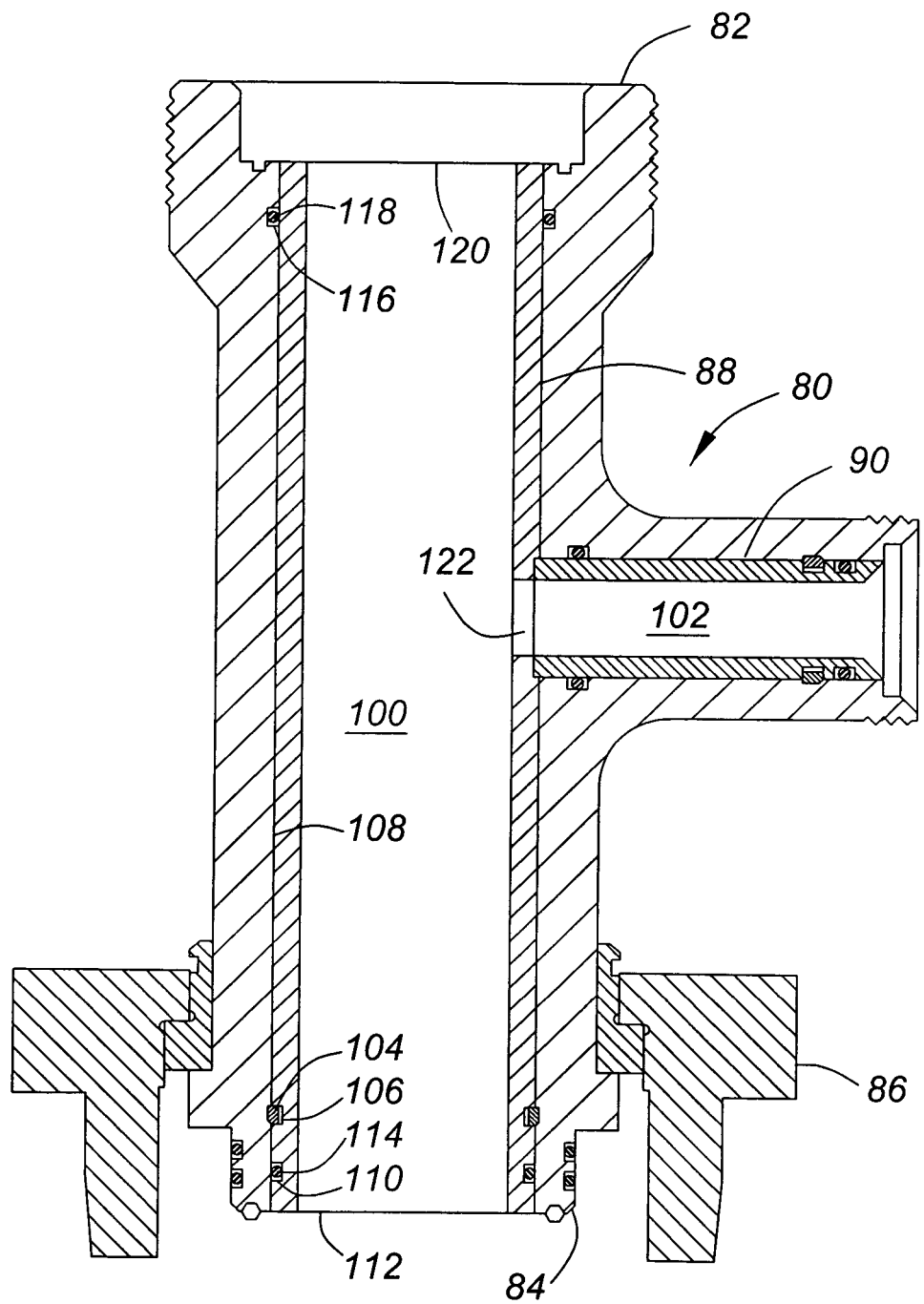
FIGS. 5 and 6 are cross-sectional views of flow-tees provisioned with the quick-change wear sleeve shown in FIG. 2.

FIG. 5 is a schematic cross-sectional diagram of another high-pressure fluid conduit in accordance the invention. The high-pressure fluid conduit shown in FIG. 5 is a flow tee 80. The flow tee 80 has a top end 82 and a bottom and 84. The top end 82 and the bottom end 84 are designed for connection to other components of a well stimulation setup using threaded unions as described above with reference to FIG. 3. A hammer nut 86 connects the bottom end 84 to another component of the well stimulation setup. The flow tee 80 has an axial passage 88 and a radial passage 90 that converge at right angles. The axial passage 88 and the radial passage and 90 are respectively fully lined using quick-change wear sleeves in accordance with the invention. The axial passage 88 is lined by a quick-change wear sleeve 100. The radial passage 90 is lined by a quick-change wear sleeve 102. The wear sleeve 100 is retained in the axial passage 88 by a retainer ring 104 received in an annular groove for 106 in an outer wall 108 of the wear sleeve 100. An O-ring groove 110 between the annular groove 106 and a bottom end 112 of the wear sleeve 100 receives an O-ring 114, as described above with reference to FIG. 3. An O-ring groove 116 in the axial passage 88 receives an O-ring 118 to provide a fluid seal at a top end 120 of the quick-change wear sleeve 100. The O-rings 114 and 118 respectively inhibit fluid migration behind the wear sleeve 100, as explained above. The quick-change wear sleeve 102 is identical in construction to the quick-change wear sleeve 100 and is received in a side port 122 in the quick-change wear sleeve 100. During installation, the quick-change wear sleeve 100 is first installed the axial passage 88 and the quick-change wear sleeve 102 is then installed in the radial passage 90. When the flow tee 80 is refurbished, the quick-change wear sleeve 102 is first removed from the radial passage 90 and then the quick-change wear sleeve 100 is removed from the axial passage 88.

Figure 6:
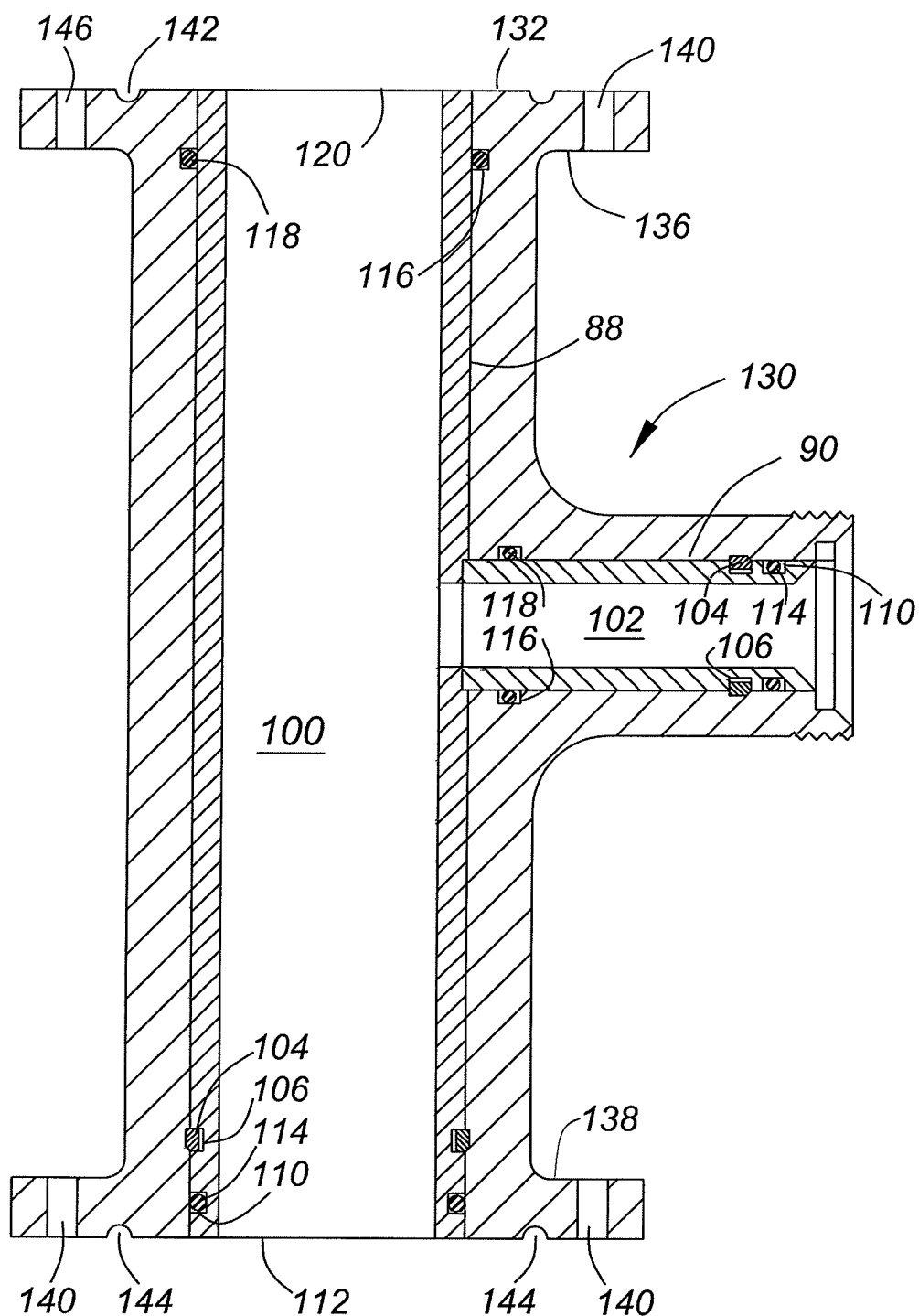

FIG. 6 is a schematic cross-sectional diagram of another flow tee 130 in accordance with the invention. The flow tee 130 is identical to the one described above with reference to FIG. 5 with the exception that a top end 132 and a bottom end 134 respectively include a flange 136, 138. As explained above with reference to FIG. 4, the flanges 136, 138 include through bores 140 that receive flange bolts (not shown), in a manner well known in the art. As also explained above, each flange includes a metal ring seal groove 142, 144 for respectively receiving a metal seal ring, typically a BX ring well known in the art. The remainder of the components of the flow tee 130 were described above with reference to FIG. 5 and that description will not be repeated.

Figure 7:
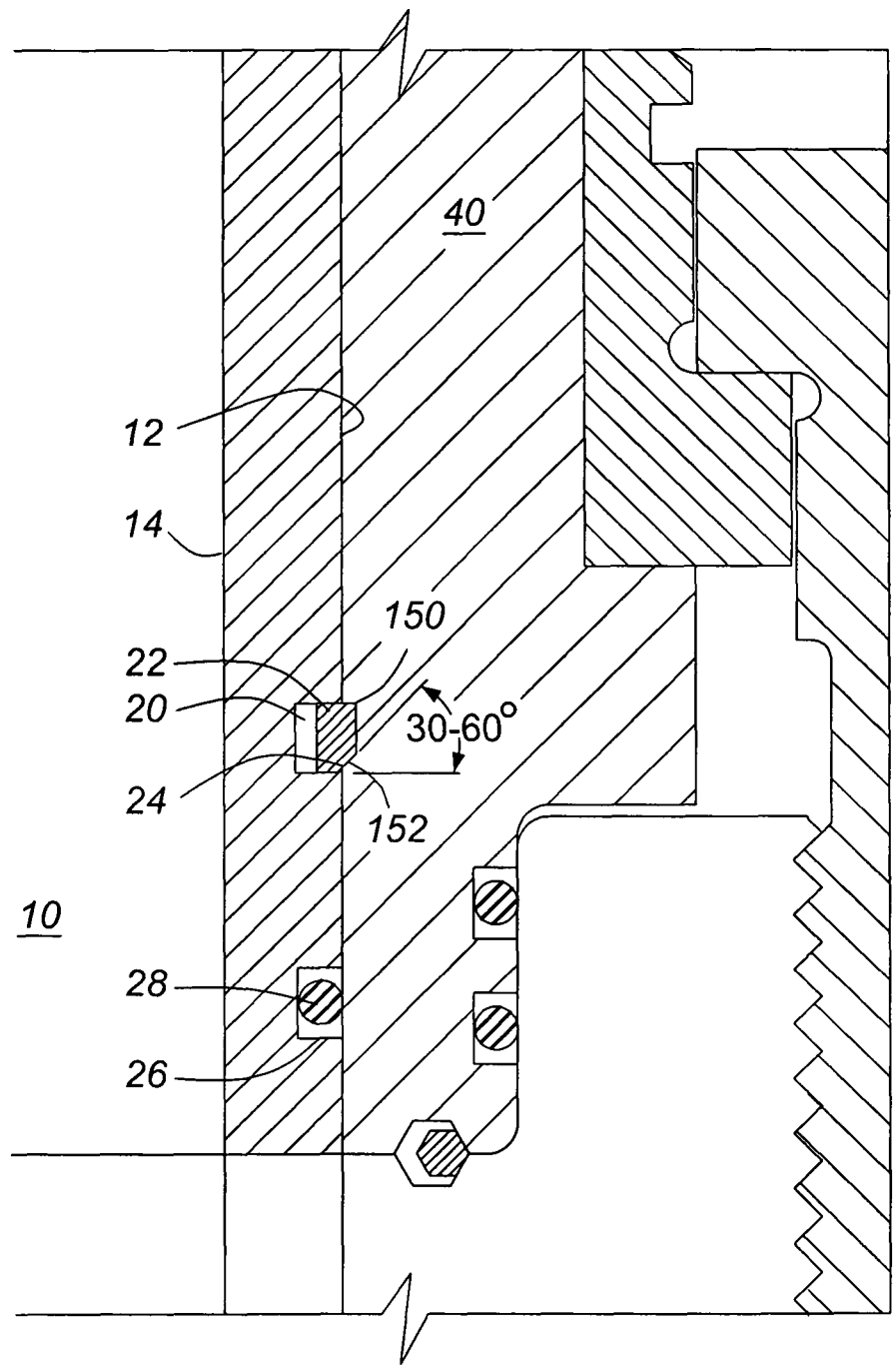
FIG. 7 is a cross-sectional view showing details of a retainer ring for securing the quick-change wear sleeves shown in FIGS. 1 and 2.

FIG. 7 is a detailed cross-sectional view of the quick-change wear sleeve 10 shown in FIGS. 3 and 5 to illustrate the construction of the retainer ring 22. As explained above with reference to FIG. 1, the retainer ring 22 is generally rectangular in cross-section, but has an upwardly angled outer bottom corner 24. The upwardly angled outer bottom corner 24 is upwardly inclined at an inclination angle of about 30°-60°, for example 45°. A corresponding annular groove 150 in the frac head 40 has a bottom edge 152 that is upwardly inclined at the same angle. These complementary upwardly inclined edges facilitate removal of the quick-change wear sleeves 10, 30, 100 and 102 from fluid conduits configured in accordance with the invention. Each of the retainer rings described above are constructed in the same manner, as are each of the complementary grooves in the fluid conduits that receive the retainer rings when the quick-change wear sleeves are installed in the respective fluid passages.

Figure 8:
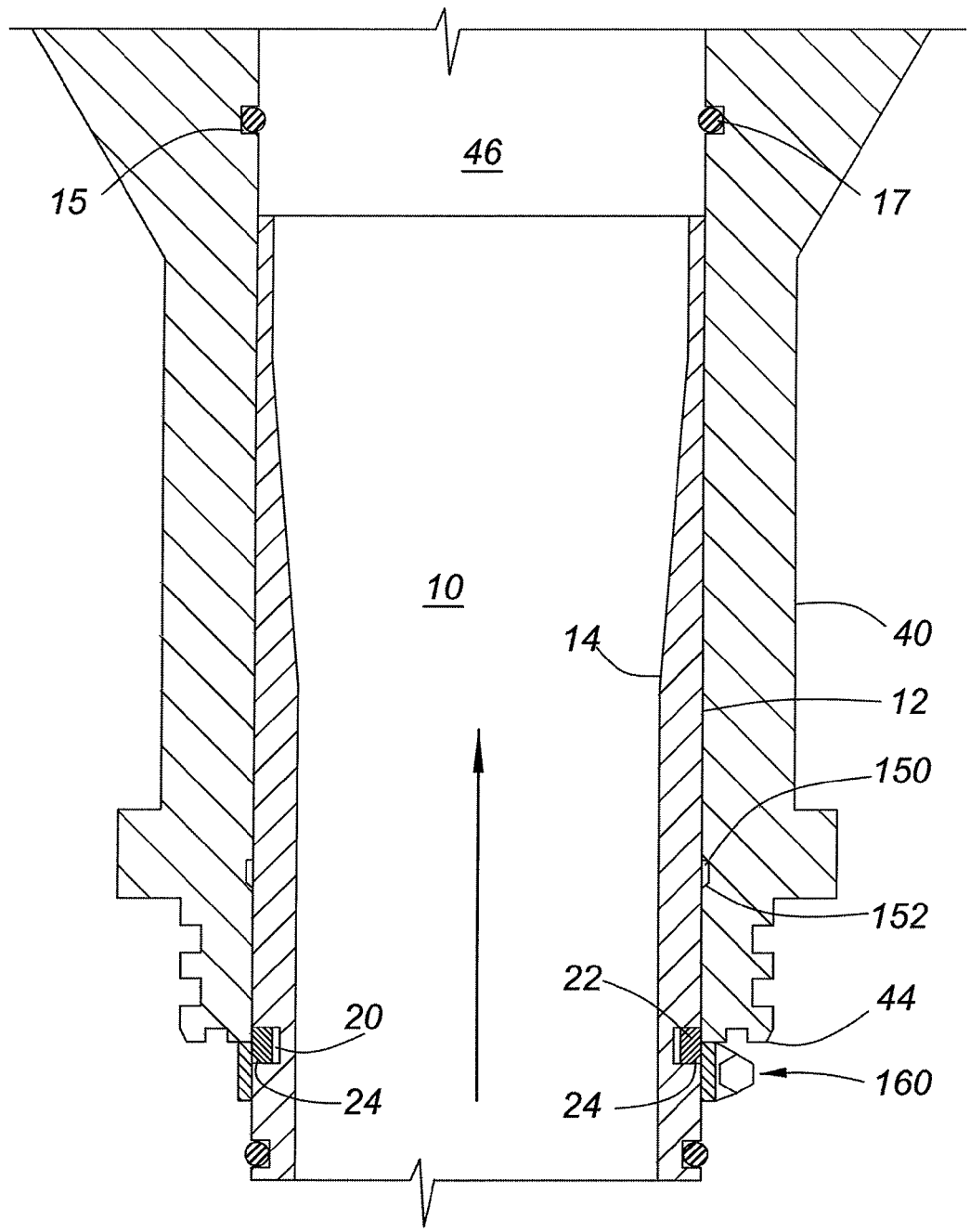
FIG. 8 is a cross-sectional view of the frac head shown in FIG. 3, illustrating installation of the quick-change wear sleeve shown in FIG. 1.

FIG. 8 is a schematic diagram illustrating the installation of the quick-change wear sleeve 10 shown in FIG. 1 in the frac head 40 shown in FIG. 3 when the frac head 40 is constructed or requires refurbishment. In order to install the quick-change wear sleeve 10, the retainer ring 22 must be compressed into a bottom of the annular groove 20 in the outer wall 12. This is readily accomplished, for example, using a ring compression tool 160, which is well known in the art and is available in a number of different styles. After the retainer ring 22 has been compressed into a bottom of the annular groove 20, the quick-change wear sleeve 10 is inserted into the axial passage 46 until the ring compression tool 160 abuts the bottom end 44 of the frac head 40. At this point, the ring compression tool can be released because the retainer ring 22 will be retained by the inner wall of the axial passage 46. After the ring compression tool 160 is removed, the wear sleeve 10 is simply slid into the axial passage 46 until the retainer ring 22 engages a complementary groove 150 in the inner wall of the axial passage 46. When this happens, the retainer ring 22 expands into the complementary groove 150 and locks the wear sleeve 10 in place. Once locked in place, an axial force of about 300 pounds (136 kg) is required to remove the retainer ring 22 from the complementary groove 150. The force required is dependent on a resilience of the retainer ring 22 and the angle of inclination of the upwardly inclined surfaces 24, 152.

Figure 9:
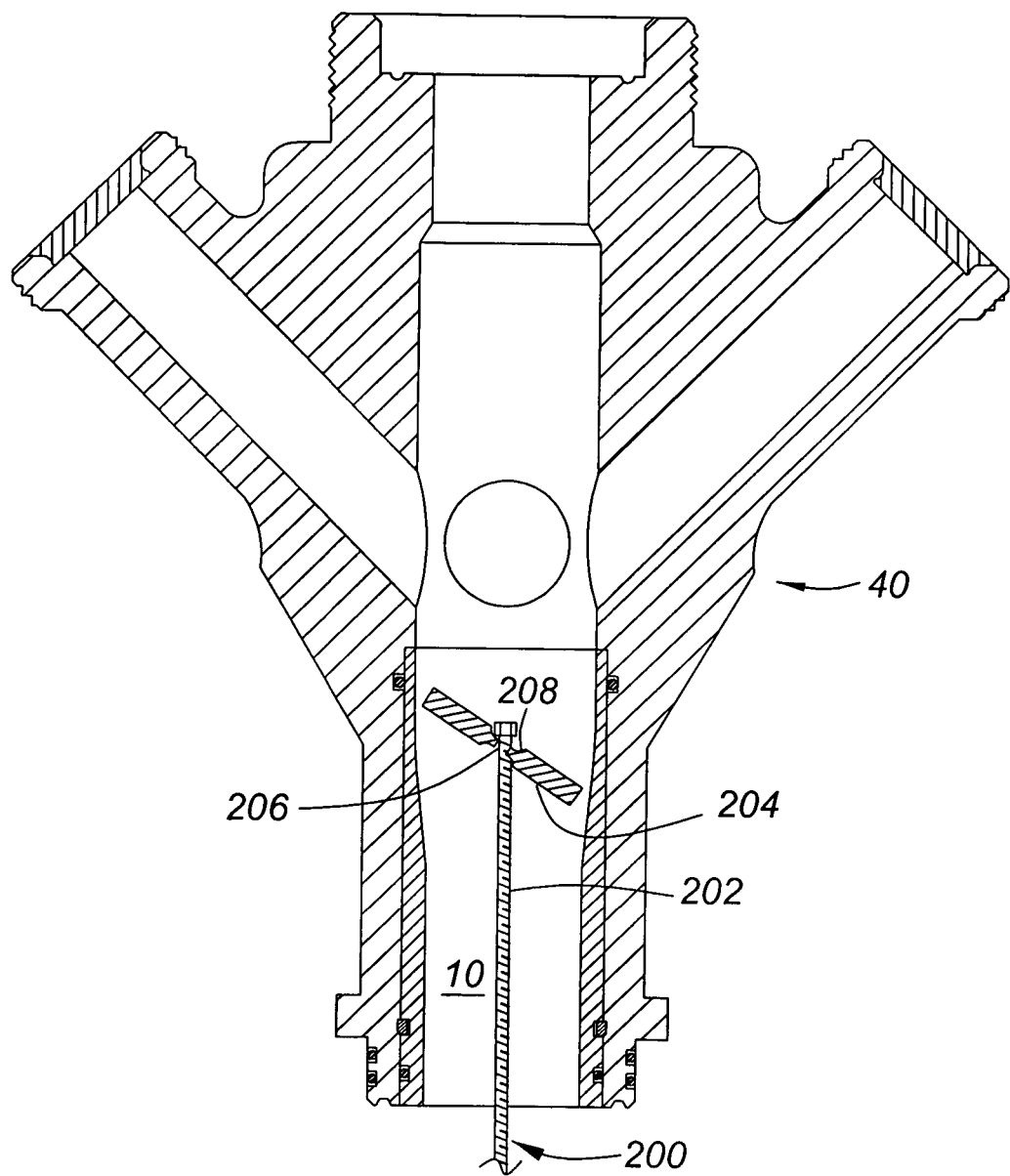
FIG. 9 is a cross-sectional view of an exemplary puller used to remove the quick-change wear sleeve shown in FIG. 1 from the frac head shown in FIG. 3.

FIG. 9 is a schematic diagram illustrating a sleeve puller generally indicated by reference 200, which may be used to remove the quick-change wear sleeve 10 from the frac head 40 illustrated in FIGS. 3 and 4. As is well known in the art, many different sleeve pullers are available for pulling cylindrical sleeves such as piston sleeves. Such pullers can also be used for removing the quick-change wear sleeves in accordance with the invention. The sleeve puller 200 includes a puller rod 202 and a puller wedge 204. The puller wedge 204 includes a central bore 206 through which the puller rod 202 extends. A wide clearance socket 208 permits the puller wedge 204 to swivel on an end of the puller rod 202. This permits the puller wedge 206 to be inserted into the quick-change wear sleeve 10 as shown in FIG. 9.

Figure 10:
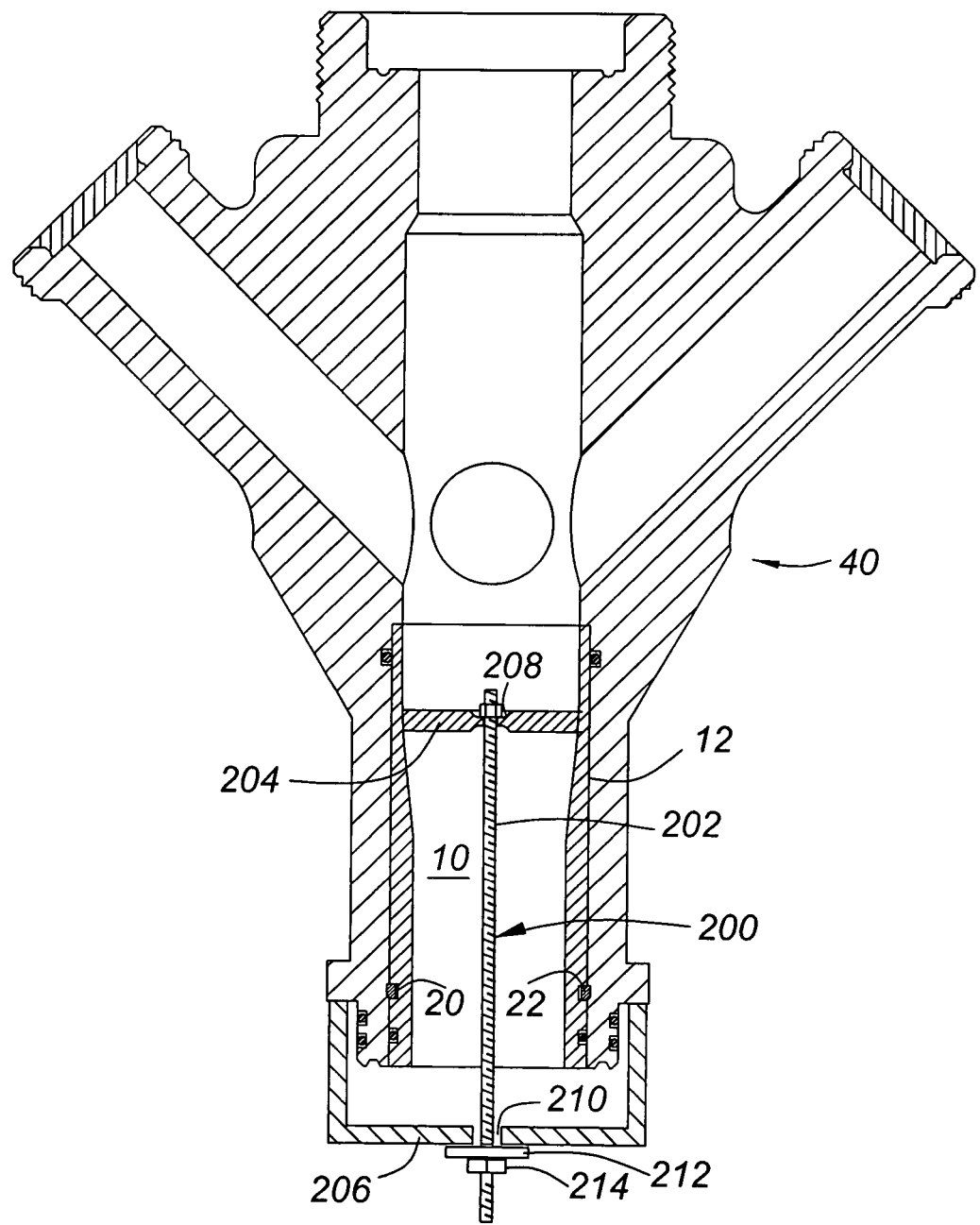
FIG. 10 is a cross-sectional view of the puller shown in FIG. 9 in an installed condition ready to extract the wear sleeve shown in FIG. 1 from the frac head shown in FIG. 3.

FIG. 10 illustrates in the sleeve puller 200 after the puller wedge 204 has been inserted into the quick-change wear sleeve 10 and manipulated into a pulling position. A puller base 206 having an axial bore 210 is moved into position so that the puller rod 202 extends through the axial bore 210. A washer 212 is slid over a free end the puller rod 202 and a nut 214, for example, is threaded onto the end of the puller rod 202. Tightening the nut 214 applies an axial force to the puller wedge 204, which in turn urges the wear sleeve 10 out to the frac head 40. As axial pressure increases, the retainer ring 22 is compressed into the annular groove 20 until the wear sleeve 10 is released from the frac head 40. Consequently, the quick-change wear sleeve 40 can be rapidly removed from a fluid conduit to permit the fluid conduit to be refurbished very quickly. After the wear sleeve 10 is removed, a replacement wear sleeve 10 is inserted, as described above with reference to FIG. 8. During refurbishment, if any other parts of the fluid conduit require repair, the repair is effected in a manner well known in the art.

The quick-change wear sleeves in accordance of the invention therefore permit wear-resistant fluid conduits to be quickly constructed and rapidly refurbished. Although the invention has been described with explicit reference to frac heads and flow tees, persons skilled in the art will understand that the quick-change wear sleeves described above can be used to improve the abrasion resistance of other fluid conduits such as flow crosses, spools, running flanges, valves and the like.

The embodiments of the invention described above are therefore intended to be exemplary only. The scope of the invention is intended to be limited solely by the scope of the appended claims.

I claim:

1. A quick-change wear sleeve for a high-pressure fluid conduit having an axial passage with an inner wall for receiving the quick-change wear sleeve, the quick-change wear sleeve comprising:
    an elongated hollow cylindrical hardened sleeve having an inner wall and an outer wall an inner end received first in the axial passage and an outer end that is substantially flush with a bottom end of the axial passage when the elongated hollow cylinder is fully inserted therein, the outer wall including a rectangular groove; and
    a retainer ring received in the rectangular groove and compressible within the rectangular groove to an extent that the retainer ring can be received within the axial passage, the retainer ring releasably engaging a complementary groove in the inner wall of the fluid conduit when the quick-change wear sleeve is fully inserted into the axial passage of the fluid conduit, the retainer ring being generally rectangular in cross-section with an outer side having a top corner and a bottom corner, the top corner preventing insertion of the retainer ring into the axial passage unless the retainer ring is compressed within the rectangular groove using a ring compression tool, the entire bottom corner being angled and the complementary groove having a bottom edge that is inclined at a same angle as the angled bottom corner of the retainer ring to release the quick-change wear sleeve from the axial passage when an axial force is applied to the elongated hollow cylindrical sleeve to urge the cylindrical sleeve out of the fluid conduit.

2. The quick-change wear sleeve as claimed in claim 1 wherein the inner wall of the quick-change wear sleeve comprises case-hardened steel.

3. The quick-change wear sleeve as claimed in claim 1 wherein the rectangular groove is formed near one end of the outer wall of the quick-change wear sleeve, and the outer wall of the quick-change wear sleeve further comprises an O-ring groove located between the one end and the rectangular groove, the O-ring groove receiving an O-ring for providing a fluid seal between the quick-change wear sleeve and the fluid conduit.

4. The quick-change wear sleeve as claimed in claim 3 wherein the one end of the outer wall of the quick-change wear sleeve comprises the outer end of the quick-change wear sleeve.

5. The quick-change wear sleeve as claimed in claim 1 wherein the inner wall of the quick-change wear sleeve is contoured to reduce turbulence in a fluid flow pumped through the fluid conduit.

6. The quick-change wear sleeve as claimed in claim 1 wherein the one angled bottom corner is upwardly inclined at an angle of 30°-60°.

7. The quick-change wear sleeve as claimed in claim 6 wherein the one angled bottom corner is upwardly inclined at an angle of about 45°.

8. The quick-change wear sleeve as claimed in claim 1 wherein the quick-change wear sleeve extends a full length of the inner wall of the axial passage through the fluid conduit.

9. The quick-change wear sleeve as claimed in claim 8 wherein the quick-change wear sleeve further comprises a side port between the inner and outer ends.

10. The quick-change wear sleeve as claimed in claim 9 further comprising a second quick-change wear sleeve, the second quick-change wear sleeve being received in a radial passage of the fluid conduit with an inner end received in the side port.

11. A quick-change wear sleeve for a high-pressure fluid conduit having an axial passage with an inner wall for receiving the quick-change wear sleeve, the quick-change wear sleeve comprising:
   an elongated hollow cylindrical hardened sleeve having a top end, a bottom end, an inner wall and an outer wall, the outer wall including a compression ring groove; and
   a compression ring received in the compression ring groove and compressible within the compression ring groove to an extent that the compression ring can be received within the axial passage until the quick-change wear sleeve is inserted in a first direction into the axial passage to an extent that the compression ring expands into a complementary groove in the inner wall of the axial passage to retain the quick-change wear sleeve within the axial passage of the fluid conduit, the compression ring being generally rectangular in cross-section with an outer side having a top corner oriented in the first direction and a bottom corner opposite the top corner, the top corner preventing insertion of the compression ring into the axial passage until the compression ring is compressed within the compression ring groove using a ring compression tool, the entire bottom corner being inclined in the first direction, and the complementary groove having an edge opposite the first direction that is also inclined in the first direction at a same angle as the bottom corner of the compression ring so that the hardened sleeve is released from the fluid conduit when an axial force is applied to the hardened sleeve to urge the hardened sleeve out of the fluid conduit.

12. The quick change wear sleeve as claimed in claim 11 wherein the bottom corner of the compression ring is inclined in the first direction at an angle of 30°-60°.

13. The quick change wear sleeve as claimed in claim 12 wherein the bottom corner of the compression ring is inclined in the first direction at an angle of about 45°.

14. The quick-change wear sleeve as claimed in claim 11 wherein the inner wall of the quick-change wear sleeve is contoured to reduce flow turbulence in a fluid flow pumped through the high-pressure fluid conduit.

15. The quick-change wear sleeve as claimed in claim 11 wherein the inner wall of the quick-change wear sleeve is case hardened.

16. The quick-change wear sleeve as claimed in claim 11 wherein the compression ring groove is formed near one end of the outer wall of the quick-change wear sleeve, and the outer wall of the quick-change wear sleeve further comprises an O-ring groove located between the one end and the compression ring groove, the O-ring groove receiving an O-ring for providing a fluid seal between the quick-change wear sleeve and the fluid conduit.

17. A quick-change wear sleeve for a frac head having an axial passage with a cavity for receiving the quick-change wear sleeve, the cavity having an inner wall, the quick-change wear sleeve comprising:
   an elongated hollow cylindrical hardened sleeve having a top end received first in the cavity, a bottom end, an inner wall and an outer wall, the outer wall including a compression ring groove near the bottom end; and
   a compression ring received in the compression ring groove and compressible within the compression ring groove to an extent that the compression ring can be received within the cavity until the top end of the quick-change wear sleeve is inserted into the cavity to an extent that the compression ring expands into a complementary groove in the inner wall of the cavity to retain the quick-change wear sleeve within the cavity, the compression ring having an outer side with a top corner and a bottom corner, the compression ring being generally rectangular in cross-section and having a top side oriented toward the top end and a bottom side oriented toward bottom end, the entire top corner being square and preventing insertion of the compression ring into the compression ring groove until the compression ring is compressed into the compression ring groove using a ring compression tool, and the entire bottom corner being inclined toward the top side at an angle of 30°-60° to release the quick-change wear sleeve from the cavity when axial force is applied to the hardened sleeve to remove the hardened sleeve from the axial passage.

18. The quick-change wear sleeve as claimed in claim 17 wherein the inner wall of the quick-change wear sleeve is contoured to reduce turbulence in a fluid flow pumped through the fluid conduit.

* * * * *

UNITED STATES PATENT AND TRADEMARK OFFICE
CERTIFICATE OF CORRECTION

| | | |
|---|---|---|
| PATENT NO. | : 8,528,585 B2 | Page 1 of 1 |
| APPLICATION NO. | : 11/414582 | |
| DATED | : September 10, 2013 | |
| INVENTOR(S) | : Bob McGuire | |

It is certified that error appears in the above-identified patent and that said Letters Patent is hereby corrected as shown below:

In the Specification:

Column 3, line 18, please change "bottom in 18" to -- bottom end 18 --

Column 3, line 57, please change "bottom end 14" to -- bottom end 44 --

Column 4, line 15, please change "in accordance the" to -- in accordance with the --

Column 4, line 25, please change "in accordance the" to -- in accordance with the --

Column 4, line 52, please change "installed the" to -- installed in the --

Column 5, line 65, please change "end the" to -- end of the --

In the Claims:

Column 8, line 41 (claim 17, line 20) please change "toward bottom" to -- toward the bottom --

Signed and Sealed this
Thirtieth Day of September, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,528,585 B2 | Page 1 of 1 |
| APPLICATION NO. | : 11/414582 | |
| DATED | : September 10, 2013 | |
| INVENTOR(S) | : McGuire | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1475 days.

Signed and Sealed this
Twenty-fourth Day of February, 2015

Michelle K. Lee
*Deputy Director of the United States Patent and Trademark Office*